R. M. ALLEN.
MOUNTING FOR VACUUM TUBES.
APPLICATION FILED MAY 24, 1918.
1,401,121.
Patented Dec. 27, 1921.
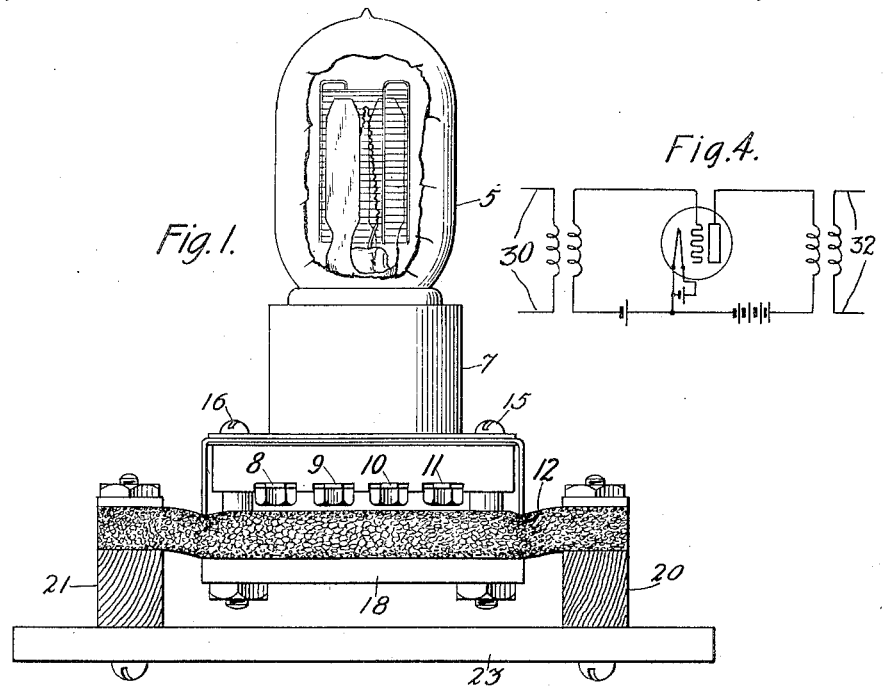
Inventor:
Roy M. Allen.
by J. G. Roberts
Atty.

UNITED STATES PATENT OFFICE.

ROY M. ALLEN, OF EAST ORANGE, NEW JERSEY, ASSIGNOR TO WESTERN ELECTRIC COMPANY, INCORPORATED, OF NEW YORK, N. Y., A CORPORATION OF NEW YORK.

MOUNTING FOR VACUUM-TUBES.

1,401,121.           Specification of Letters Patent.     Patented Dec. 27, 1921.

Application filed May 24, 1918. Serial No. 236,398.

*To all whom it may concern:*

Be it known that I, ROY M. ALLEN, a citizen of the United States, residing at East Orange, in the county of Essex and State of New Jersey, have invented certain new and useful Improvements in Mountings for Vacuum-Tubes, of which the following is a full, clear, concise, and exact description.

This invention relates to mountings for vacuum tubes and an object thereof is to provide mountings for vacuum tubes that will protect them from external blows or other disturbances.

In a vacuum tube of the audion type there are usually inclosed in an evacuated vessel a cathode or filament, an anode usually in the form of a plate, and a third electrode usually called a grid. Such a tube has been put to many uses in the art, such as amplifying alternating currents, speech currents and the like. As is well known, the usual method of employing such a tube is to vary the potential of the grid in accordance with the currents to be amplified, whereby the space current flowing between the cathode and anode will be varied accordingly, which variations being in amplified form, may be impressed on still other amplifiers for further amplification, or may be impressed upon the desired outgoing line.

The amount of current flowing in the tube for a given value of voltage applied between the cathode and anode depends on the distance between the cathode and anode, since the internal impedance of the tube varies with the distance between these electrodes. The amount of space current also depends on the proximity of the grid to the cathode. The closer the grid is to the cathode for a given change of charge on the grid, the greater will be the corresponding change in the space current. In the light of these facts, it is therefore apparent that while the tube is being employed in a circuit for amplifying or repeating currents of any type, any variation in the space relation of the three electrodes of the tube with respect to each other would produce a corresponding variation in the space current of the tube, which along with the amplified currents, would be impressed on the outgoing line and would be impressed on the receiving apparatus, thereby interfering with the proper reception of the current waves and may, in many instances, make them wholly unintelligible or drown out the waves completely.

When a tube is subjected to a sudden shock or blow, or is subjected to the mechanical vibration of the tube's support or base, it is found that the electrodes are set to vibrating, each vibrating more or less at its natural period of vibration, which will be continued for some time even after the external blow or vibration has ceased, depending upon the damping of the electrodes. The vibration of the electrodes, of course, varies the space relation so that fluctuations corresponding to their vibrations are produced in the output circuit current of the tube, thereby making the tube highly inefficient, as described above.

In accordance with this invention, this objectionable vibration of the electrodes of the vacuum tube is prevented by providing a highly damped elastic mounting for the tube, so that any shock or vibration of its supporting structure will be absorbed without being appreciably transmitted to the electrodes. As one specific example of such a mounting, it has been found that a tube mounted on a cushion of sponge rubber suitably supported is very efficient for producing the effect desired.

For the better understanding of this invention reference is made to the following detailed description taken in connection with the accompanying drawings, in which Figure 1 represents one embodiment of this invention; Fig. 2 is a top view thereof; Fig. 3 is a modification of Fig. 1; and Fig. 4 shows how a vacuum tube may be connected up in a system for repeating alternating currents.

Referring particularly to Figs. 1 and 2, 5 is a vacuum tube mounted in a socket 7 having the contact terminals 8, 9, 10 and 11. This socket is not a part of this invention, but constitutes the subject matter of Patent No. 1,325,865, granted Dec. 23, 1919. This socket 7 is attached to a piece of sponge rubber 12 by bolts 13, 14, 15 and 16 and through the intermediary of the same bolts a heavy plate 18 is attached to the underside of the rubber. This rubber 12 is swung or suspended between two suitable supports such as the wooden blocks 20 and 21, which in turn are suitably fastened to the base or flooring 23 on which the structure rests.

Fig. 3 represents one modification that may be made in the above structure which consists as shown in doubling under the ends of the rubber 12 before attaching them to their respective supports.

It is evident that a blow or vibration impressed directly on a vacuum tube must be of a certain magnitude and must have a frequency above a given value, depending on the structure of the tube and upon the natural period of each of the electrodes before the effect of the disturbance will be sufficient to vary the space relation of the electrodes. This invention therefore contemplates a mounting for a tube which can be interposed between the base subjected to the disturbances and the tube itself of such a character that it will absorb most of the energy of the impressed blow and will give the tube and the members integral therewith such a low period of vibration that the fraction of the energy which does reach the tube has such a low period of vibration that the electrodes will vibrate substantially as a unit about their points of support, rather than vibrating individually and producing fluctuations in the space current flowing therebetween. The manner in which this is accomplished by the structure described above may be explained by noting that the weight of the socket and tube has been considerably increased by attaching a heavy plate 18 thereto, so that the natural period of vibration of the socket and tube is very greatly increased, and that the material 8 connecting the tube and socket to the base receiving the undesired vibrations, is elastic and highly damped, so that only a very small portion of the original energy of the disturbing vibrations can be transmitted to the socket. On account of the porous character of the sponge rubber, much of the disturbing energy impressed on the rubber is absorbed in the compressing and expelling of air from the cells of the rubber. The energy of the vibration of the base transmitted to the rubber will therefore be highly damped as above described, so that only a small fraction of the energy will be transferred to the socket and bulb which, on account of their low natural frequency, will not vibrate rapidly enough as a unit to set the individual electrodes in vibration.

It is therefore apparent that if the tube 5 together with its shock-absorbing mounting is connected up in any electrical system such, for example, as the one shown in Fig. 4, currents impressed on the tube from the line 30 will be repeated to a line 32 without any appreciable distortion, due to the tendency of the tube's electrodes to vibrate.

Although the theory above given is the most plausible one that can be given at the present time in regard to the operation of this invention, it is not intended in any manner to limit this invention which is defined in the appended claims.

It is to be understood that this invention is not limited to a rubber cushion for a vacuum tube, as any other suitable material may be used for the purpose of absorbing the energy of shocks that would otherwise be transmitted to the tube. Various modifications in the supporting structure may therefore be made without departing in any way from the spirit of this invention as, for example, the weight 18 may be incorporated in the socket 7, or in any other portion of the tube structure.

What is claimed is:

1. A repeater of electric currents having input and output terminals, and electrodes which maintain a relatively fixed space relation during the repeater operation and means for preventing external vibrations from appreciably changing the space relation of said electrodes.

2. In combination, a vacuum tube having a cathode, an anode, and a control electrode in fixed relation to each other, and a resilient support for said tube for preventing external vibrations from appreciably changing the space relation of said electrodes.

3. A vacuum tube having a plurality of spaced electrodes, means for establishing a space current therebetween, a base for said tube, flexible material supported by said base for supporting said tube whereby the effect of the vibration of said base on said space current is reduced, and an additional weight supported by said material for further reducing said effect.

In witness whereof, I hereunto subscribe my name this 18th day of May, A. D. 1918.

ROY M. ALLEN.